United States Patent Office 2,698,852
Patented Jan. 4, 1955

2,698,852

STEROID PRODUCTION

Philip F. Beal III, Portage Township, Kalamazoo County, and Alan H. Nathan and John A. Hogg, Kalamazoo Township, Kalamazoo County, Mich., assignors to The Upjohn Company, Kalamazoo, Mich., a corporation of Michigan No Drawing. Application June 5, 1953,
Serial No. 359,968

19 Claims. (Cl. 260—397.1)

This invention relates to novel steroid compounds, more particularly to novel 3-benzylthio-21-alkoxyoxalyl-3,5-pregnadiene-20-ones and their alkali-metal enolates, a process for their production, and to a novel process for the production of progesterone-21-glyoxalic acids wherein the novel 3-benzylthio-21-alkoxyoxalyl-3,5-pregnadiene-20-one and their alkali-metal enolates are valuable intermediates.

It is an object of the present invention to provide novel 3-benzylthio-21-alkoxyoxalyl-3,5 - pregnadiene - 20 - ones, their alkali-metal enolates, and a process for the production thereof. Another object is the provision of a process for the production of progesterone-21-glyoxalic acids. Other objects will be apparent to those skilled in the art to which this invention pertains.

The novel process of the present invention and the novel compounds produced therein may be represented by the following sequence of reactions:

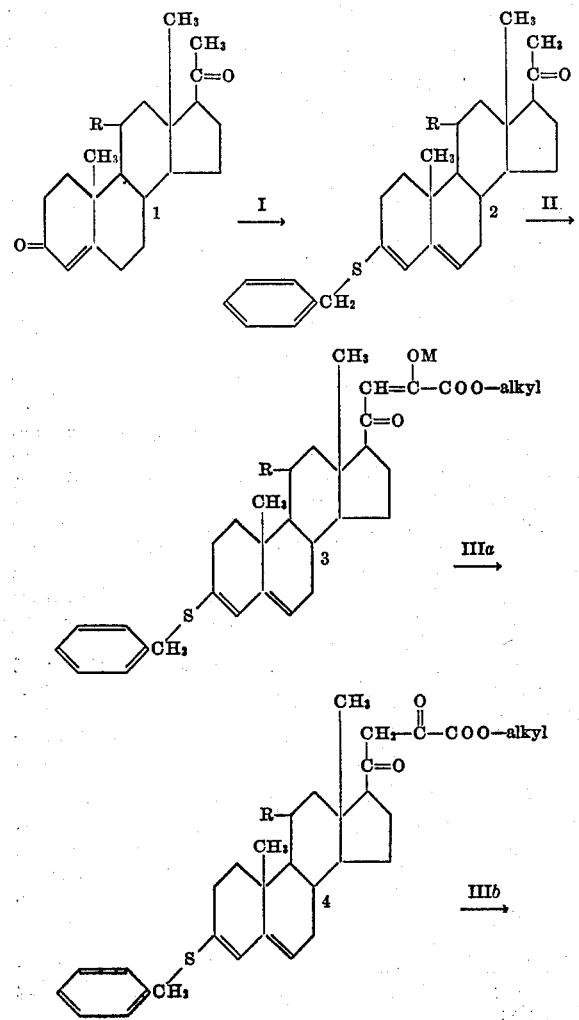

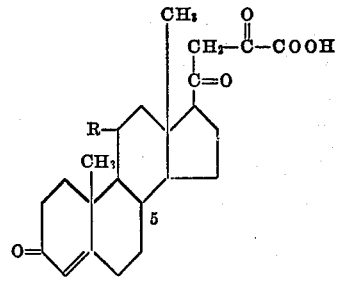

wherein R is an α-hydroxy group or a ketonic oxygen (=O), and wherein M is an alkali metal.

According to Step I of the present invention, a progesterone represented by Formula I is reacted with benzyl mercaptan in the presence of a reaction catalyst to produce a 3-benzylthio-3,5-pregnadiene-20-one (2) which is condensed in Step II with an alkyl ester of oxalic acid, preferably a lower-alkyl ester, in the presence of an alkali-metal base condensing agent, to produce a 3-benzylthio - 21 - alkoxyoxalyl - 3,5 - pregnadiene - 3 - one alkali-metal enolate (3). Step III involves the hydrolysis of the thus-produced 3-benzylthio - 21 - alkoxyoxalyl-3,5-pregnadiene-3-one alkali-metal enolate under acidic conditions to produce a progesterone-21-glyoxalic acid (5). This hydrolysis involves first (IIIa), the neutralization of the alkali-metal enolate (3) to produce the free enol (4) which is then (IIIb) hydrolyzed by the acid to a 21-glyoxalic acid (5).

Starting steroids for the process of the present invention are 11α-hydroxyprogesterone and 11-ketoprogesterone. The formation of a 3-benzylthio ether of these compounds before they are reacted with ethyl oxalate and an alkali-metal base condensing agent allows the use of large excesses of these condensing agents, thus-producing optimum yields of monoglyoxalated steroid. If a thioether is not employed, the glyoxalation step must be performed with only about one molar equivalent of base to prevent diglyoxalation of the starting steroid. Under these conditions, however, some starting steroid is invariably recovered unreacted, thus reducing the ultimate yield of glyoxalic acid. If the molar ratio of base to steroid is increased by the use of an excess of base, diglyoxalation of the starting steroid occurs, and the yield of 21-glyoxalic acid of Formula 5 is therefore reduced. The method of the present invention provides a method of obtaining high yields of 21-glyoxalated steroid (5) from progesterones of Formula I uncontaminated with 2-glyoxalic acids which are difficult to separate from the desired product.

The choice of reaction catalyst, ratio of reactants, temperature, particular solvent and other operating conditions is not critical to the success of the reaction of Step I, within normal operating limits. The common catalysts for thioether formation are satisfactory, e. g., pyridine hydrochloride, zinc chloride, hydrogen chloride, and the like. However, the use of boron trifluoride as the reaction catalyst gives much higher yields of product than the use of other catalysts and is therefore preferred. The common non-reactive solvents may be used as reaction solvents, e. g., methanol, ethanol, tertiary butyl alcohol, toluene, benzene, methylene chloride, chlorobenzene, chloroform, ether, and the like, and the reaction may be conducted at a temperature between about room temperature and the boiling point of the reaction mixture. Usually a considerable excess of benzyl mercaptan is employed in the reaction. If Step I and Step II are to be performed concurrently without any intermediate isolation, the choice of a reaction solvent in which the thioether produced in Step I is substantially soluble is preferred.

Step II, the glyoxalation step, can be performed under substantially the same conditions of temperature and time, and with the same solvents as can be used in Step I. Alkali-metal base condensing agents include the alkali metals, the alkali-metal hydrides, amides and alkoxides, and alkyl alkali-metals. Preferred are the alkali-metal alkoxides, preferably lower-alkyl, especially sodium methoxide and sodium ethoxide. The preferred alkyl esters of oxalic acid are methyl oxalate and ethyl oxalate.

The first stage of Step III, the conversion of the alkali-metal enolate produced in Step II to the free enol, may be performed in any normal manner employed in a neutralization reaction. Usually the alkali-metal enolate is dissolved in an aqueous organic solvent mixture, e. g., methanol and water, and an acid is then added to react with the alkali-metal salt, thus liberating the free enol steroid. Since the next stage of Step III is the hydrolysis of the benzylthioether group and the alkoxyoxalyl group, the two stages are usually performed concurrently without an isolation of the free enol (4), using a strong mineral acid, e. g., hydrochloric or sulfuric acid. Usually a temperature substantially above room temperature is required to complete the hydrolysis reaction. The thus-produced 21-glyoxalic acid can be isolated by distilling the solvent from the resulting mixture and extracting the product with dilute aqueous sodium hydroxide to produce an aqueous solution of the sodium salt of the 21-glyoxalic acid. Acidifying this alkaline extract produces a precipitate of a 21-glyoxalic acid (5) which can be purified in conventional manner.

Reacting a 21-glyoxalic acid (5) with one molar equivalent of iodine followed by decarboxylation with sodium hydroxide is productive of a 21-iodoprogesterone which is converted to a 21-acetoxyprogesterone by treatment with potassium acetate. Reactions of this type are described in U. S. Patents 2,554,472-3. If the starting steroid in Step I is 11-ketoprogesterone, the 21-acetoxy compound thus-produced is dehydrocorticosterone acetate, whereas 11α-hydroxyprogesterone is converted to 11-epicorticosterone acetate which can be converted to dehydrocorticosterone acetate by reaction with chromic acid or other oxidizing agent.

The following examples are illustrative of the products and process of the present invention but are not to be construed as limiting.

*Example 1.—3-benzylthio-3,5-pregnadiene-11,20-dione*

A mixture of forty milliliters of ethanol, 125 milliliters of benzene, and 8.6 grams (0.026 mole) of 11-ketoprogesterone was heated to the reflux temperature and 25 milliliters of distillate was removed whereafter six milliliters (0.048 mole) of benzyl mercaptan and one gram of pyridine hydrochloride were added and the resulting mixture refluxed for five hours. A large portion of the reaction solvent was removed by distillation at reduced pressure and 100 milliliters of methanol was added to the residue whereupon 3-benzyl-mercapto-3,5-pregnadiene-11,20-dione immediately commenced to precipitate from the mixture. The mixture was cooled for sixteen hours in a refrigerator and the resulting precipitated crystals removed by filtration and then dried in a vacuum desiccator. The yield of 3-benzylthio-3,5-pregnadiene-11,20-dione melting at 151 to 154 degrees centigrade was 5.9 grams, a yield of 55 percent of the theoretical.

*Analysis.*—Calculated for $C_{28}H_{34}O_2S$: S, 7.55. Found: S, 7.70.

*Example 2.—3-benzylthio-3,5-pregnadiene-11,20-dione*

Twenty grams (0.061 mole) of 11-ketoprogesterone in twenty milliliters of methylene chloride was mixed with 150 milliliters of methanol and eight milliliters of benzyl mercaptan, five milliliters of boron trifluoride (as the etherate) was added and the resulting mixture was maintained at fifty degrees centigrade. Crystallization commenced soon after the mixing and after 1.5 hours, the solution was cooled and the precipitate filtered to yield, in two crops, 24 grams of 3-benzylthio-3,5-pregnadiene-11,20-dione, the first of which melted at 158 to 160 and the second at 155 to 160 degrees centigrade.

In the same manner as described in Examples 1 and 2, 3-benzylthio-11α-hydroxy-3,5-pregnadiene-20-one is prepared by substituting 11α-hydroxyprogesterone for the 11-ketoprogesterone used as the starting steroid.

*Example 3.—3-benzylthio-21-ethoxyoxalyl-3,5-pregnadiene-11,20-dione and its sodium enolate*

A solution of 0.8 gram of sodium in 25 milliliters of absolute methanol and 100 milliliters of dry benzene was distilled until the temperature of the distillate reached about 76 degrees centigrade whereupon 3.6 milliliters of ethyl oxalate followed by a solution of 7.97 grams of 3-benzylthio-3,5-pregnadiene-11,20-dione in fifty milliliters of dry benzene was added to the resulting suspension of sodium methoxide and the mixture was stirred at room temperature for two hours. Ether was added to completely precipitate the thus-produced 3-benzylthio-21-ethoxyoxalyl-3,5-pregnadiene-11,20-dione sodium enolate which was filtered and dried to yield 10.44 grams of crude sodium enolate.

An aqueous solution of this crude sodium enolate was acidified with acetic acid to produce a precipitate of the free enol which was filtered, dried, and recrystallized from a mixture of acetone and water to yield 3-benzyl-thio-21-ethoxyoxalyl-3,5-pregnadiene-11,20-dione melting anywhere from 132 to 134 degrees centigrade to 141.5 to 145.5 degrees centigrade. A sample melting at 134 to 136 degrees centigrade had the analysis given below.

*Analysis.*—Calculated for $C_{32}H_{38}O_5S$: S, 6.00. Found: S, 6.00.

In the same manner, 3-benzylthio-11α-hydroxy-21-ethoxyoxalyl-3,5-pregnadiene-20-one and its sodium enolate are prepared by substituting 3-benzylthio-11α-hydroxy-3,5-pregnadiene-20-one for the 3-benzylthio-3,5-pregnadiene-11,20-dione used in Example 3 as the starting steroid.

Other 3 - benzylthio-21-alkoxyoxalyl-3,5-pregnadiene-20-ones (4) are prepared by substituting other alkyl esters of oxalic acid for the ethyl oxalate used in Example 3, e. g., methyl oxalate, propyl oxalate, amyl oxalate, etc., producing, for example, 3-benzylthio-21-methoxyoxalyl-3,5-pregnadiene-11,20-dione and its sodium enolate and 3-benzylthio-11α-hydroxy-21-methoxyoxalyl-3,5-pregnadiene-20-one and its sodium enolate. Other alkali-metal enolates can be prepared by substituting potassium tertiary butoxide or lithium methoxide for the sodium ethoxide used in Example 3 producing the potassium enolate and the lithium enolate, respectively.

*Example 4.—11-ketoprogesterone-21-glyoxalic acid*

Eighteen milliliters of a 1 N solution of hydrochloric acid was added to a solution of 3.10 grams of 3-benzyl-thio-21-ethoxyoxalyl-3,5-pregnadiene-11,20-dione sodium enolate in 180 milliliters of ethyl alcohol and the resulting mixture refluxed for two hours. The solvent was then distilled from the hydrolyzed mixture by evaporation at about fifty degrees centigrade with nitrogen being flushed over the surface during the evaporation until a 25-milliliter residue was obtained. Fifty milliliters of a five percent aqueous sodium hydroxide solution was added to this residue and the alkaline solution was extracted with three 25-milliliter portions of ether. The alkaline solution was then acidified to a pH of 6 with ammonium chloride and extracted once more with three 25-milliliter portions of ether. The aqueous layer was made strongly acidic with hydrochloric acid, thus precipitating crystals of 11-ketoprogesterone-21-glyoxalic acid which, when dried, melted at 200 to 210 degrees centigrade and weighed 1.80 grams, a yield of eighty percent of the theoretical.

Similarly, 11α-hydroxyprogesterone-21-glyoxalic acid is prepared by substituting the sodium enolate of 3-benzylthio - 11α - hydroxy-21-ethoxyoxalyl-3,5-pregnadiene-20-one for the 3-benzylthio-21-ethoxyoxalyl-3,5-pregnadiene-11,20-dione sodium enolate used as the starting steroid in Example 4.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. 3-benzylthio - 21 - alkoxyoxalyl-3,5-pregnadiene-20-ones represented in their enolic form by the following formula:

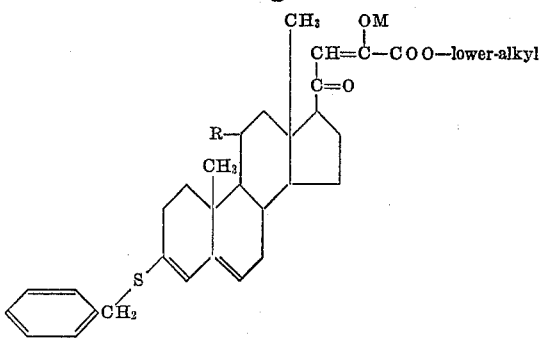

wherein R is selected from the group consisting of an α-hydroxy group, and a ketonic oxygen, and wherein M is selected from the group consisting of hydrogen and an alkali-metal.

2. 3-benzylthio - 11α - hydroxy-21-lower-alkoxyoxalyl-3,5-pregnadiene-20-one alkali-metal enolate.

3. 3-benzylthio - 21 - lower-alkoxyoxalyl-3,5-pregnadiene-11,20-dione alkali-metal enolate.

4. 3-benzylthio-11α-hydroxy-21-ethoxyoxalyl-3,5-pregnadiene-20-one sodium enolate.

5. 3-benzylthio-21-ethoxyoxalyl-3,5-pregnadiene-11,20-dione sodium enolate.

6. A process for the production of a 3-benzylthio-21-alkoxyoxalyl-3,5-pregnadiene-20-one alkali-metal enolate which includes the steps of (1) reacting a compound selected from the group consisting of 11α-hydroxyprogesterone and 11-ketoprogesterone, with benzyl mercaptan in the presence of an acidic reaction catalyst to produce a 3-benzylthio-3,5-pregnadiene-20-one; and (2) reacting the thus-produced thioether with an alkyl diester of oxalic acid and an alkali-metal base condensing agent to produce a 3-benzylthio-21-alkoxyoxalyl-3,5-pregnadiene - 20 - one alkali-metal enolate represented by the following formula:

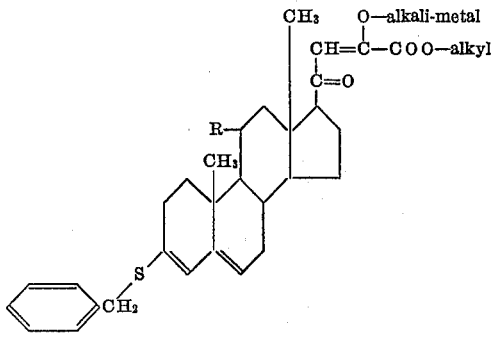

wherein R is selected from the group consisting of an α-hydroxy group and a ketonic oxygen.

7. A process for the production of a 3-benzylthio-21-alkoxyoxalyl - 3,5 - pregnadiene-11,20-dione alkali-metal enolate which includes the steps of (1) reacting 11-ketoprogesterone with benzyl mercaptan in the presence of an acidic reaction catalyst to produce 3-benzylthio-3,5-pregnadiene-11,20-dione; and (2) reacting the thus-produced thioether with an alkyl diester of oxalic acid and an alkali-metal alkoxide to produce a 3-benzylthio-21-alkoxyoxalyl - 3,5 - pregnadiene-11,20-dione alkali-metal enolate.

8. The process of claim 7 wherein the alkyl diester of oxalic acid is ethyl oxalate.

9. A process for the production of a 3-benzylthio-11α-hydroxy-21-alkoxyoxalyl-3,5-pregnadiene-20-one alkali-metal enolate which includes the steps of (1) reacting 11α-hydroxyprogesterone with benzyl mercaptan in the presence of an acidic reaction catalyst to produce 3-benzylthio-11α-hydroxy-3,5-pregnadiene-20-one; and (2) reacting the thus-produced thioether with an alkyl diester of oxalic acid and an alkali-metal alkoxide to produce 3-benzylthio-11α-hydroxy-21-alkoxyoxalyl-3,5-pregnadiene-20-one alkali-metal enolate.

10. The process of claim 9 wherein the alkyl diester of oxalic acid is ethyl oxalate.

11. A process for the production of a progesterone-21-glyoxolic acid which includes the steps of (1) reacting a compound selected from the group consisting of 11α-hydroxyprogesterone, and 11-ketoprogesterone, with benzyl mercaptan in the presence of an acidic reaction catalyst to produce a 3-benzylthio-3,5-pregnadiene-20-one; (2) reacting the thus-produced thioether with an alkyl diester of oxalic acid and an alkali-metal base condensing agent to produce a 3-benzylthio-21-alkoxyoxalyl-3,5-pregnadiene-20-one alkali-metal enolate; and (3) hydrolyzing the thus-produced alkoxyoxalyl steroid, under aqueous acidic conditions, to produce a progesterone-21-glyoxalic acid represented by the following formula:

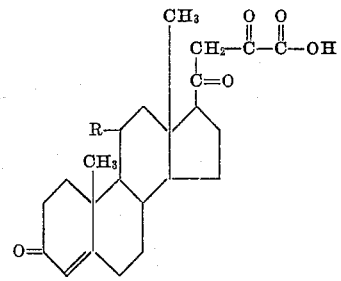

wherein R is selected from the group consisting of an α-hydroxy group and a ketonic oxygen.

12. A process for the production of 11-ketoprogesterone-21-glyoxalic acid which includes the steps of (1) reacting 11-ketoprogesterone with benzyl mercaptan in the presence of an acidic reaction catalyst to produce 3-benzylthio-3,5-pregnadiene-11,20-dione; (2) reacting the thus-produced thioether with an alkyl diester of oxalic acid and an alkali-metal alkoxide to produce a 3 - benzylthio - 21 - alkoxyoxalyl - 3,5 - pregnadiene-11,20-dione alkali-metal enolate; and (3) hydrolyzing the thus-produced alkoxyoxalyl steroid with a mineral acid to produce 11-ketoprogesterone-21-glyoxalic acid.

13. The process of claim 12 wherein the reaction catalyst of Step 1 is boron trifluoride.

14. The process of claim 12 wherein the alkyl diester of oxalic acid in Step 2 is ethyl oxalate.

15. A process for the production of 11-ketoprogesterone-21-glyoxalic acid which includes the steps of (1) reacting 11-ketoprogesterone with benzyl mercaptan in the presence of boron trifluoride to produce 3-benzylthio-3,5-pregnadiene-11,20-dione; (2) reacting the thus-produced thioether with ethyl oxalate and sodium methoxide to produce 3-benzylthio-21-ethoxyoxalyl-3,5-pregnadiene-11,20-dione sodium enolate; and (3) hydrolyzing the thus-produced ethoxyoxalyl steroid with a mineral acid to produce 11-ketoprogesterone-21-glyoxalic acid.

16. A process for the production of 11α-hydroxyprogesterone-21-glyoxalic acid which includes the steps of (1) reacting 11α-hydroxyprogesterone with benzyl mercaptan in the presence of an acidic reaction catalyst to produce 3-benzylthio-11α-hydroxy-3,5-pregnadiene-20-one; (2) reacting the thus-produced thioether with an alkyl diester of oxalic acid and an alkali-metal alkoxide to produce 3-benzylthio-11α-hydroxy-21-alkoxyoxalyl-3,5-pregnadiene-20-one alkali-metal enolate; and (3) hydrolyzing the thus-produced alkoxyoxalyl steroid with a mineral acid to produce 11α-hydroxyprogesterone-21-glyoxalic acid.

17. The process of claim 16 wherein the reaction catalyst of Step 1 is boron trifluoride.

18. The process of claim 16 wherein in Step 2 the alkyl diester of oxalic acid is ethyl oxalate.

19. A process for the production of 11α-hydroxyprogesterone-21-glyoxalic acid which includes the steps of (1) reacting 11α-hydroxyprogesterone with benzyl mercaptan in the presence of boron trifluoride to produce 3-benzylthio-11α-hydroxy-3,5-pregnadiene-20-one; (2) reacting the thus-produced thioenol ether with ethyl oxalate and sodium methoxide to produce 3-benzylthio-11α-hydroxy-21-ethoxyoxalyl-3,5-pregnadiene-20-one sodium enolate; and (3) hydrolyzing the thus-produced ethoxyoxalyl steroid with a mineral acid to produce 11α-hydroxyprogesterone-21-glyoxalic acid.

No references cited.